(12) United States Patent
Wang et al.

(10) Patent No.: US 12,339,906 B2
(45) Date of Patent: Jun. 24, 2025

(54) METHOD, DEVICE, AND COMPUTER PROGRAM PRODUCT FOR DATA QUERY

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 18/508,549

(22) Filed: Nov. 14, 2023

(65) Prior Publication Data

US 2025/0131040 A1    Apr. 24, 2025

(30) Foreign Application Priority Data

Oct. 23, 2023   (CN) .......................... 202311381055.7

(51) Int. Cl.
*G06F 16/9032* (2019.01)
*G06F 16/901* (2019.01)

(52) U.S. Cl.
CPC ...... *G06F 16/9032* (2019.01); *G06F 16/9017* (2019.01)

(58) Field of Classification Search
None
See application file for complete search history.

(56) References Cited

U.S. PATENT DOCUMENTS

| 2021/0026887 | A1* | 1/2021  | Fukushima | ......... G06F 16/7837 |
| 2021/0272326 | A1* | 9/2021  | Simpson   | ................ G06N 3/084 |
| 2022/0343106 | A1* | 10/2022 | Choi      | ..................... G06V 10/776 |
| 2024/0292073 | A1* | 8/2024  | Khalil    | .................... G06V 20/46 |

OTHER PUBLICATIONS

A. Radford et al., "Learning Transferable Visual Models From Natural Language Supervision," International Conference on Machine Learning, arXiv:2103.00020v1, Feb. 26, 2021, 48 pages.

K. Xu et al., "Show, Attend and Tell: Neural Image Caption Generation with Visual Attention," Proceedings of the 32nd International Conference on Machine Learning, vol. 37, Jul. 2015, 10 pages.

(Continued)

*Primary Examiner* — Eddy Cheung

(74) *Attorney, Agent, or Firm* — Ryan, Mason & Lewis, LLP

(57) ABSTRACT

A method in an illustrative embodiment includes selecting, according to a type of input data, a target pre-trained model from a deep network pool including a plurality of pre-trained models; performing, by using the selected target pre-trained model, feature extraction on the input data to determine text descriptors for the input data; and generating, based on the text descriptors, a query table for query. The method can select, according to different input data, different target pre-trained models from the deep network pool including the plurality of pre-trained models to process (e.g., compress) the input data. The method assembles a plurality of deep networks into a pool to automatically process data to obtain text descriptors for data retrieval, thereby achieving efficient data compression and retrieval.

20 Claims, 8 Drawing Sheets

(56) References Cited

OTHER PUBLICATIONS

S. Herdade et al., "Image Captioning: Transforming Objects into Words," 33rd Annual Conference on Neural Information Processing Systems, Dec. 2019, 11 pages.

X. Yang et al., "Auto-Encoding Scene Graphs for Image Captioning," 2019 IEEE/CVF Conference on Computer Vision and Pattern Recognition (CVPR), Jun. 2019, pp. 10677-10686.

X. Hu et al., "VIVO: Visual Vocabulary Pre-Training for Novel Object Captioning," The Thirty-Fifth AAAI Conference on Artificial Intelligence, Feb. 2021, pp. 1575-1583.

H. Xu et al., "VLM: Task-agnostic Video-Language Model Pre-training for Video Understanding," arXiv:2105.09996v3, Sep. 30, 2021, 13 pages.

G. Li et al., "CLOP: Video-and-Language Pre-Training with Knowledge Regularizations," arXiv:2211.03314v1, Nov. 7, 2022, 10 pages.

C. Sun et al., "VideoBERT: A Joint Model for Video and Language Representation Learning," 2019 IEEE/CVF International Conference on Computer Vision (ICCV), Oct. 2019, pp. 7464-7473.

C. Sun et al., "Learning Video Representations using Contrastive Bidirectional Transformer," arXiv:1906.05743v2, Sep. 27, 2019, 12 pages.

A. Radford et al., "Robust Speech Recognition via Large-Scale Weak Supervision," Proceedings of the 40th International Conference on Machine Learning, Jul. 2023, 27 pages.

C. Wang et al., "Neural Codec Language Models are Zero-Shot Text to Speech Synthesizers," arXiv:2301.02111v1, Jan. 5, 2023, 16 pages.

A. Baevski et al., "wav2vec 2.0: A Framework for Self-Supervised Learning of Speech Representations," 34th Conference on Neural Information Processing Systems, Dec. 2020, 12 pages.

Y.-A. Chung et al., "W2v-BERT: Combining Contrastive Learning and Masked Language Modeling for Self-Supervised Speech Pre-Training," arXiv:2108.06209v2, Sep. 13, 2021, 7 pages.

C.-H. Lin et al., "Magic3D: High-Resolution Text-to-3D Content Creation," IEEE Conference on Computer Vision and Pattern Recognition (CVPR), Jun. 2023, pp. 300-309.

B. Poole et al, "DreamFusion: Text-to-3D using 2D Diffusion," arXiv:2209.14988v1, Sep. 29, 2022, 18 pages.

N. Ruiz et al., "Dreambooth: Fine Tuning Text-to-Image Diffusion Models for Subject-Driven Generation," Proceedings of the IEEE/CVF Conference on Computer Vision and Pattern Recognition, Jun. 2023, pp. 22500-22510.

J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.

* cited by examiner

METHOD, DEVICE, AND COMPUTER PROGRAM PRODUCT FOR DATA QUERY

RELATED APPLICATION

The present application claims priority to Chinese Patent Application No. 202311381055.7, filed Oct. 23, 2023, and entitled "Method, Device, and Computer Program Product for Data Query," which is incorporated by reference herein in its entirety.

FIELD

Embodiments of the present disclosure mainly relate to the field of data management, and more particularly, to a method, a device, and a computer program product for data query.

BACKGROUND

Large Language Models (LLMs) have flourished recently, leading to the ongoing development of Artificial Intelligence Generated Content (AIGC). Many new applications have been announced to generate artificial intelligence data. Such achievements are attributed to the advancement of deep learning, especially large-scale deep learning models. However, more advanced artificial intelligence models generate artificial data (increasing exponentially), requiring more data storage and better data management. Therefore, a new data storage and query technology is needed to cope with a large amount of artificial intelligence data, so as to be capable of effectively managing a large amount of real and synthetic data.

SUMMARY

Example embodiments according to the present disclosure provide content lossless data storage and query based on a deep network pool. In some embodiments, a multimodal neural network pool is provided, which can be used for storing and managing text, audio, images/videos, and 3D data. The method according to the present disclosure assembles a plurality of deep networks into a pool, which can automatically process data to obtain text descriptors or identifiers for data retrieval. The overall memory cost of the deep network pool and the small overhead of the text descriptors are significantly lower than original data. It can also achieve efficient data compression and data retrieval. All synthetic data generated by artificial intelligence models can alternatively be stored as a model itself (e.g., only text descriptors are stored, etc.), without storing the original synthetic data. It can significantly reduce data storage and effectively retrieve query data with relatively small computational overhead.

In a first aspect of embodiments of the present disclosure, a method for data query is provided, including: selecting, according to a type of input data, a target pre-trained model from a deep network pool comprising a plurality of pre-trained models; performing, by using the selected target pre-trained model, feature extraction on the input data to determine text descriptors for the input data; and generating, based on the text descriptors, a query table for query.

In a second aspect of embodiments of the present disclosure, an electronic device is provided. The electronic device includes at least one processor; and a memory coupled to the at least one processor and having instructions stored therein, wherein the instructions, when executed by the at least one processor, cause the electronic device to perform the following actions: selecting, according to a type of input data, a target pre-trained model from a deep network pool comprising a plurality of pre-trained models; performing, by using the selected target pre-trained model, feature extraction on the input data to determine text descriptors for the input data; and generating, based on the text descriptors, a query table for query.

In a third aspect of embodiments of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect of the present disclosure.

It should be understood that the content described in this Summary is neither intended to limit key or essential features of embodiments of the present disclosure, nor intended to limit the scope of the present disclosure. Other features of the present disclosure will become readily understood from the Detailed Description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, LLMs have flourished recently, leading to the ongoing development of AIGC. Performance of the LLMs and the AIGC are very impressive and have become an important component of the new era of Big Data. Many new applications have been announced to generate artificial intelligence data. Such achievements are attributed to the advancement of deep learning, especially large-scale deep learning models. However, more advanced artificial intelligence models generate artificial data (increasing exponentially), requiring more data storage and better data management. A new data storage and query technology is needed to cope with a large amount of artificial intelligence data, so as to be capable of effectively managing a large amount of real and synthetic data.

Conventionally, data storage is based on bit rate compression, deduplication, and other data-based processing. However, the AIGC has demonstrated that large deep learning models can store all data for operation and retrieval. Taking a large model as an example, it has been trained by at least 570 GB of text, books, and other source data, and a deep learning model with 175B parameters is generated, with a model size of approximately 230 GB and a data compression rate of approximately 2.48. If it is considered to use the large model to generate (infinitely if possible) synthetic text data, this number can be further reduced. This information gain is very significant and cannot be ignored.

Figure 1:
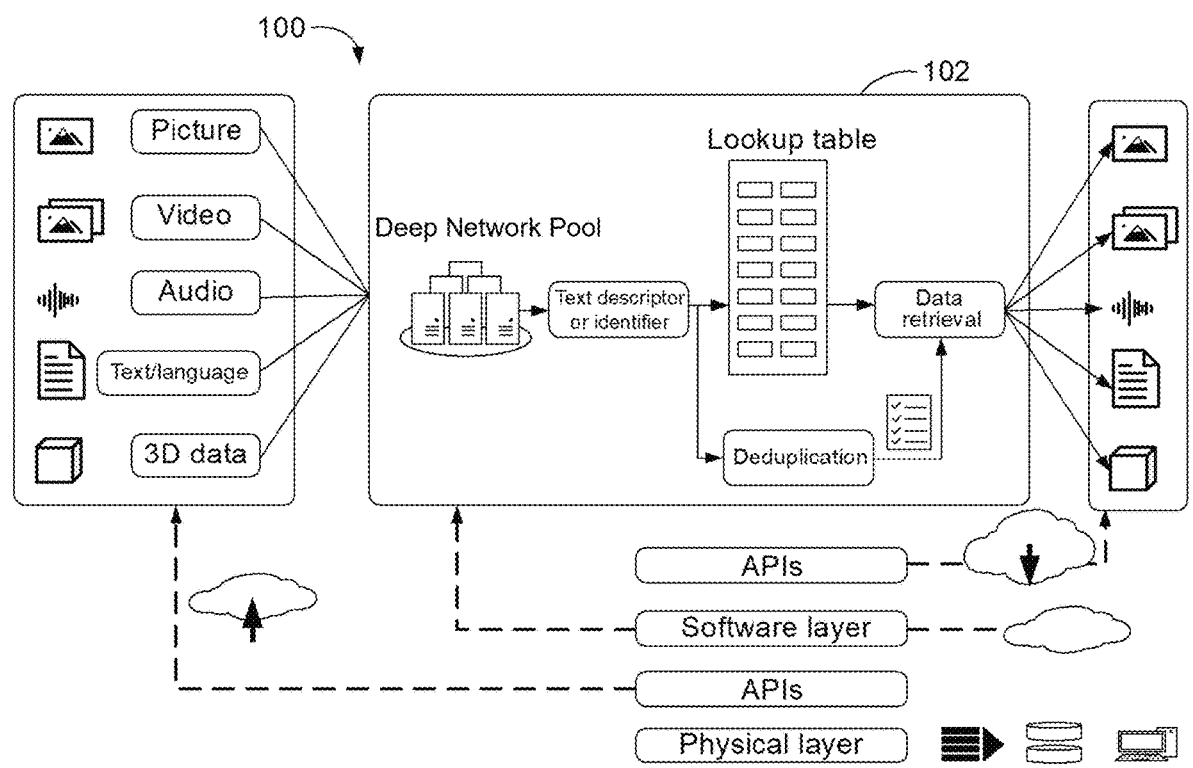
FIG. 1 shows a schematic diagram of an example environment in which a plurality of embodiments of the present disclosure can be implemented.

FIG. 1 shows a schematic diagram of an example environment 100 in which a plurality of embodiments of the present disclosure can be implemented. A computing device 102 in the example environment 100 may be any device with a computing capability. As a non-limiting example, the computing device 102 may be any type of fixed computing device, mobile computing device, or portable computing device, including but not limited to a desktop computer, a laptop computer, a notebook computer, a netbook computer, a tablet computer, a multimedia computer, a mobile phone, and the like. All components or part of the components of the computing device 102 may also be distributed at a cloud.

In the example environment 100, various types of data (including pictures (e.g., images), audio, videos, text/language (e.g., natural language text), and 3D data) may be input into the computing device 102 as input data. The computing device 102 may include various types of software, and the management method for data storage and query according to the present disclosure may be embedded and implemented as a software layer on a physical layer of a server and a memory. The computing device 102 processes the input data (e.g., some pictures) to generate text descriptors or identifiers (IDs) corresponding to the data to form a lookup table for querying. The input data may be input into a deep network pool through application program interfaces (APIs). A plurality of deep networks for text, audio, images/videos, and 3D data form the deep network pool. For different input data, one or a plurality of suitable deep networks may be selected from the plurality of deep networks to process the input data to obtain the text descriptors or identifiers specific to the data. Optionally, the text descriptors or identifiers may also be deduplicated, so as to deduplicate the input data to obtain a query table that does not contain duplicate text descriptors. When conducting data retrieval, users can input query requests through application program interfaces (APIs) for data retrieval. Then, based on the comparison of the query requests and the lookup table, the computing device 102 may restore the data to output uncompressed data. The entire data access and management process (including data storage and query methods) may be provided to customers as cloud services. Many related applications may be added as new features.

In order to further illustrate the method for data query provided by the embodiments of the present disclosure, the embodiments of the present disclosure will be further described with reference to FIG. 2 to FIG. 7B.

Figure 2:
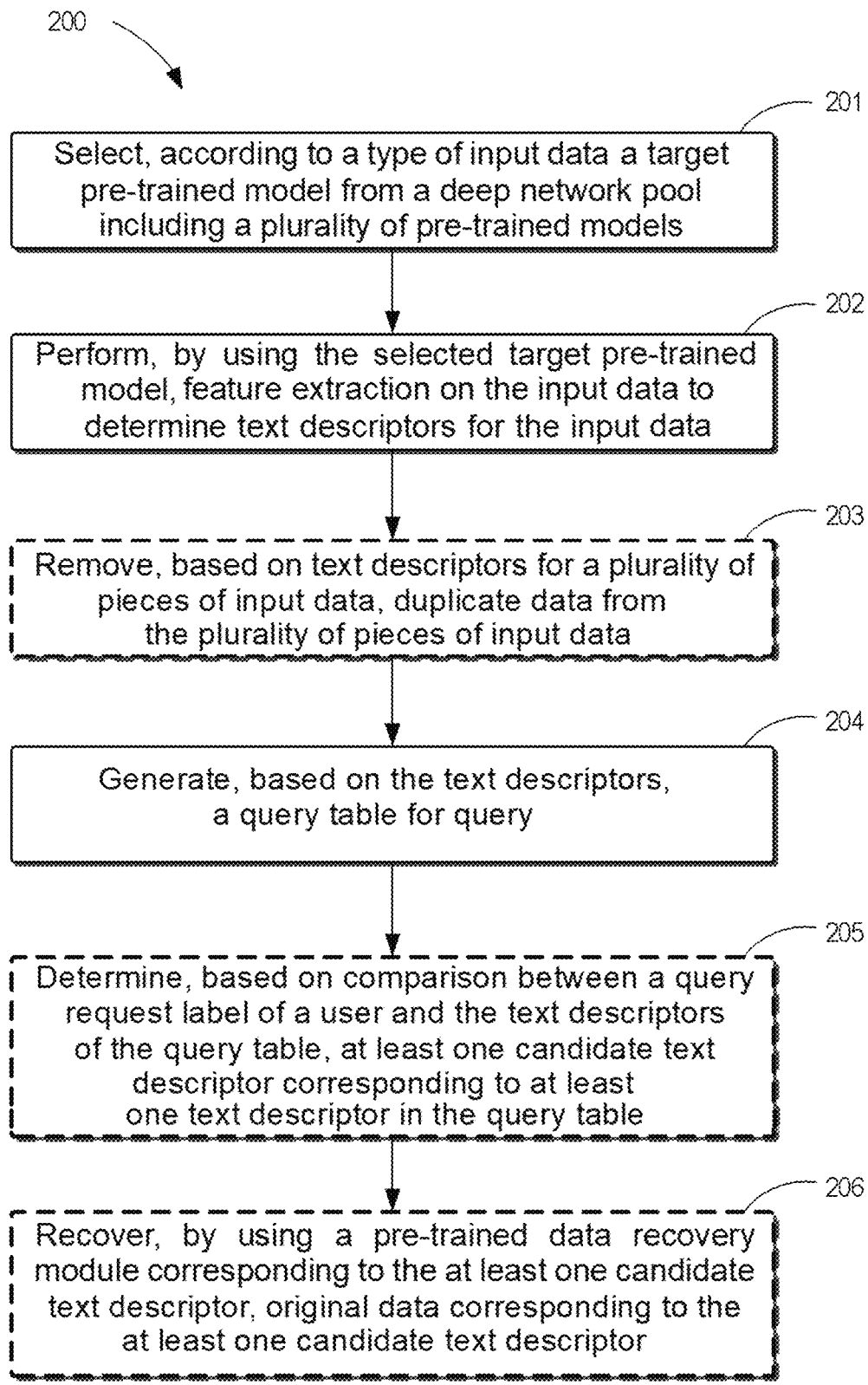
FIG. 2 shows a flow chart of a method for data processing according to some embodiments of the present disclosure.
Figure 3:
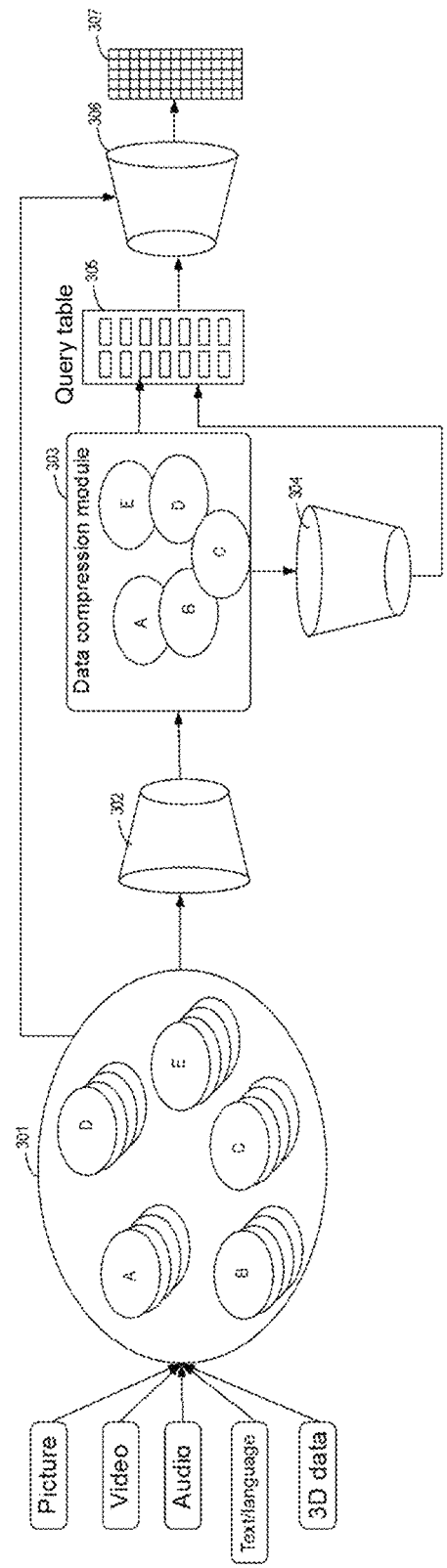
FIG. 3 shows a schematic diagram of a detailed architecture for data management according to some embodiments of the present disclosure.

FIG. 2 shows a flow chart of a method 200 for data processing according to some embodiments of the present disclosure. FIG. 3 shows a schematic diagram of a detailed architecture for data management according to some embodiments of the present disclosure.

As will be described in more detail below, a detailed architecture for data management in some embodiments includes three parts: 1) model selection, 2) deduplication, and 3) candidate selection. Before model selection, a model library is formed, including many pre-trained deep learning models (PTMs), which have been pre-configured and installed for use. However, based on input data, a model selection module will be used for determining an optimal model combination to process data X to obtain a corresponding data feature F. The model selection module samples the input data to evaluate performances of candidate models, and selects the best model to process the data. Then, the detailed architecture for data management further includes a deduplication module for further processing the data feature F and removing duplicate features through a feature similarity measurement result. The compressed and deduplicated features form a lookup table, and the table will be used for data retrieval. The design purpose of a final candidate item selection module is to provide N candidates that match the user query. In other words, if the user intends to retrieve pictures of traveling in Japan as an example, the model may search for all possible matches and return all relevant images. Various steps and modules are described in detail below with reference to FIG. 2 and FIG. 3.

As shown in FIG. 2, at a block 201, a target pre-trained model is selected, according to a type of input data, from a deep network pool including a plurality of pre-trained models. As shown in FIG. 3, the input data may include any one of pictures, audio, videos, text/language, and 3D data. Alternatively, the input data may be at least a portion of any type of data, such as a subset of a plurality of pictures. As shown in FIG. 3, the computing device 102 may include a deep network pool 301 (also known as a model storage module), which may include various pre-trained models. Among these pre-trained models, a first type of a plurality of pre-trained models A may be used for processing pictures, a second type of a plurality of pre-trained models B may be used for processing audio, a third type of a plurality of pre-trained models C may be used for processing videos, a fourth type of a plurality of pre-trained models D may be used for processing text/language, and a fifth type of a plurality of pre-trained models E may be used for processing 3D data. The types of pre-trained models mentioned above are only examples and may include other types of pre-trained models when other types of data are included. As shown in FIG. 3, the computing device 102 also includes a model selection module 302, which selects a target pre-trained model from a plurality of pre-trained models based on the type of the input data.

The model library is a collection of a plurality of deep learning models. For given user data, an optimal model is selected for data compression and corresponding properties are extracted for storage. Also, corresponding models are selected for use in data retrieval (or data reconstruction). Mathematically speaking, the data compression model may be defined as F=G(X), wherein X is the user data, and F is the extracted feature. Data retrieval may be defined as X=H(F), wherein H is an inverse process of G.

Figure 4:
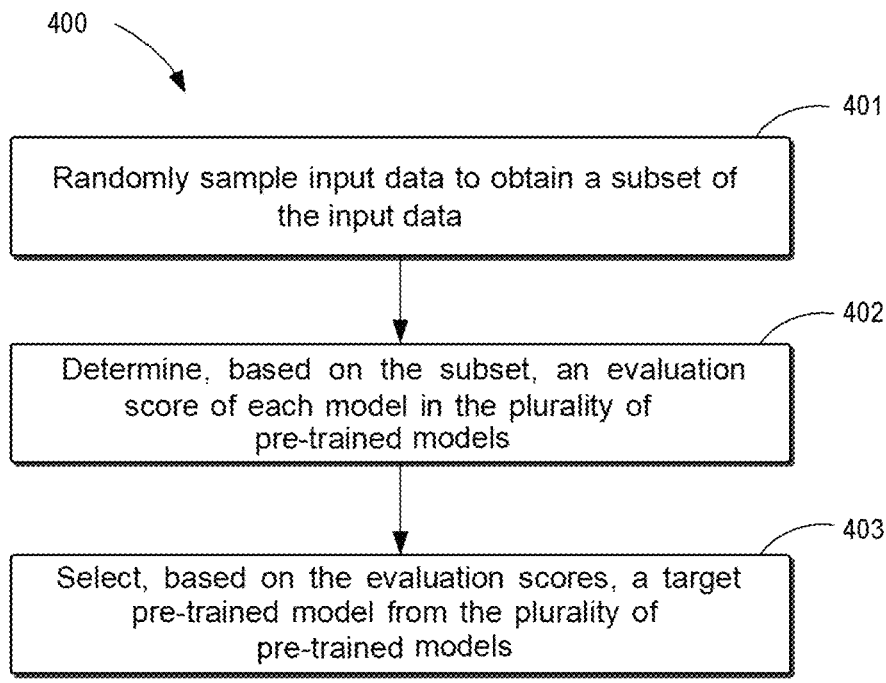
FIG. 4 shows a flow chart of a process for model selection according to some embodiments of the present disclosure.

A flow chart of a process 400 for model selection according to some embodiments of the present disclosure will be illustrated below with reference to FIG. 4.

In the model selection process 400, first, at a block 401, the input data is randomly sampled to obtain a subset of the input data. The input data here may be any one of images, audio, videos, text/language, and 3D data. The data is randomly sampled to obtain a subset of the data, such as a subset of pictures from a plurality of pictures.

Then, at a block 402, based on the subset, an evaluation score of each model in the plurality of pre-trained models is determined. The evaluation score is defined by three criteria: 1) data fidelity, 2) compression rate, and 3) computational complexity. Mathematically speaking, the data fidelity may be defined as D=Q (Y|X), wherein X is the original data, Y is the compressed data, and Q is the evaluation of information loss, i.e., the L2 norm. For the data fidelity, it has an opposite relationship with the compression rate (R) and the computational complexity (C). When a user prioritizes the data fidelity over the complexity and the compression rate, he/she will spend more time and computational resources to maximize the encoding of the original data for compression.

The data fidelity D may be set, in other words, the data fidelity may be divided into several intervals. Various models may be scored based on the data fidelity, that is, the cost estimation P(D) of each model may be obtained according to the following Equation (1):

$$P(D) = \begin{cases} \dfrac{\lambda}{R(D)} & \text{for } D < \tau_1 \\ \dfrac{\alpha}{R(D)} + \beta C(D) & \text{for } \tau_1 \le D \le \tau_2 \\ \gamma C(D) & \text{for } \tau_2 > D \end{cases} \quad (1)$$

wherein $\alpha$, $\beta$, $\gamma$, and $\lambda$ are hyperparameters, respectively. When the data fidelity D is less than a threshold $\tau_1$, it is low-quality data compression and retrieval, with a priority given to the data compression rate R(D). When the data fidelity D is between $\tau_1$ and $\tau_2$, it is medium-quality data compression and retrieval, considering the data compression rate R(D) and the computational complexity C(D), which are inversely proportional and directly proportional to the cost estimation P(D), respectively. When the data fidelity D is greater than $\tau_2$, it is high-quality data compression and retrieval, considering the computational complexity C(D), as the data compression rate has little impact on almost lossless data compression.

In other words, the process of scoring a model may include: determining the data fidelity of a subset; calculating, based on the data fidelity, the data compression rate and computational complexity of each model; and determining, based on the calculated data compression rate and computational complexity, cost estimation for each model (e.g., scoring it). If the determined data fidelity is greater than $\tau_2$, various models are scored according to the range $\tau_2>D$ of Equation (1) to calculate its cost estimation.

At a block 403, based on the determined evaluation score, a target pre-trained model is selected from the plurality of pre-trained models. After determining the score of each model, the most suitable target pre-trained model may be selected from the plurality of pre-trained models for the type of input data. If the user sets different data fidelities for the same input data (e.g., the same audio, video, or image data), the most suitable pre-trained model selected will also be different. The suitable target pre-trained model may be a single model or a combination of a plurality of models.

Returning to FIG. 2 and FIG. 3, as shown in FIG. 2, at a block 202, feature extraction is performed on the input data using the selected target pre-trained model to determine text descriptors for the input data. As shown in FIG. 3, after processing by the model selection module, various types of pre-trained models suitable for various types of data can be selected. As shown in FIG. 3, the computing device further includes a data compression module 303, which processes (e.g., compresses) the input data using the selected target pre-trained model to obtain the corresponding feature F. The feature F can be a vector, which may be a text descriptor or an identifier. The text descriptor requires very little storage space relative to original data.

Considering that there may be some duplicate data in the input data, for example, the same picture is input many times, deleting the duplicate data can be considered. Referring back to FIG. 2 and FIG. 3, at a block 203, there is an optional step to remove duplicate data from a plurality of pieces of input data based on the text descriptors for the plurality of pieces of input data. The text descriptors here are text descriptors for a set of associated data, in other words, there may be duplicate content between them.

In order to eliminate the duplicate data, as shown in FIG. 3, the computing device further includes a data deduplication module 304, and the data deduplication module is used for identifying potential spatial representations of data, gathering similar data together, and dispersing different data. Specifically, the low-dimensional projection of the data is learned for extracting eigenvectors for manifold learning.

Figure 5A:
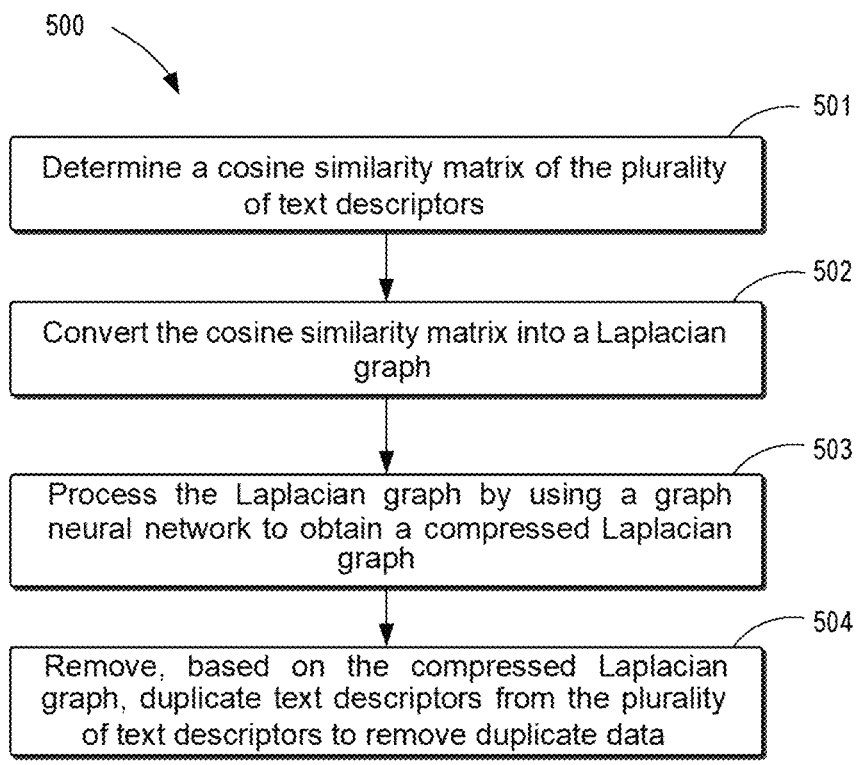
FIG. 5A and FIG. 5B show a flow chart and a schematic diagram of a process for data deduplication according to some embodiments of the present disclosure.
Figure 5B:
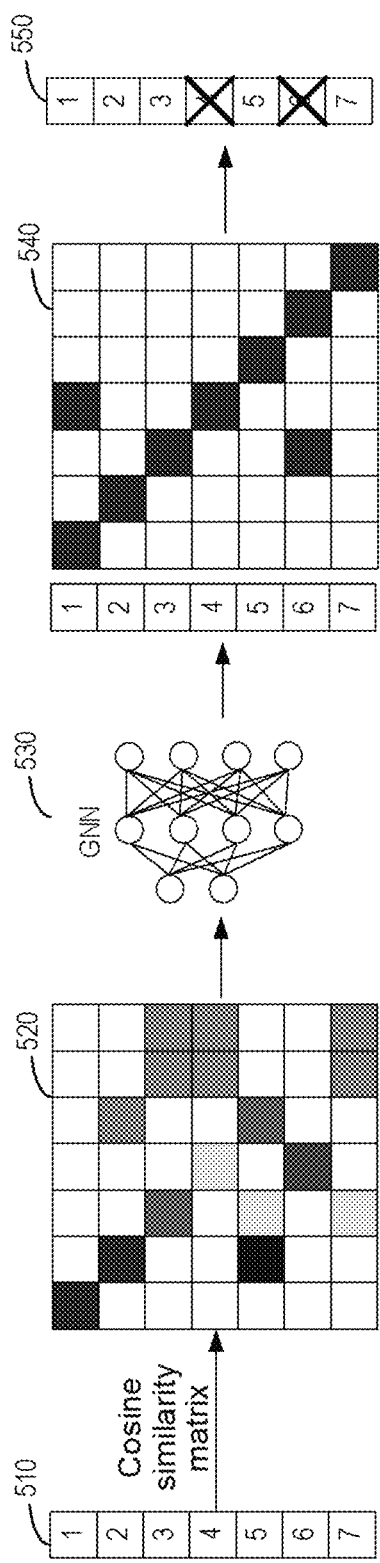

A process 500 for data deduplication will be described in detail below with reference to FIG. 5A and FIG. 5B. As shown in FIG. 5A, at a block 501, a cosine similarity matrix of a plurality of text descriptors is determined.

For a feature vector $F \in R^{1 \times 512}$ of given input data, the feature vector $F \in R^{1 \times 512}$ may correspond to 512 text descriptors in the query table (each text descriptor may be a vector). As illustrated in FIG. 5B, only 1 to 7 text descriptors 510 are shown as examples. First, the cosine similarity matrix $CS=F \times F^T$ of the feature vector F of the input data is calculated. That is, the cosine similarity matrix CS between 512 entries or text descriptors in the lookup table is calculated. Each element of the cosine similarity matrix CS may measure the similarity between two vectors in the feature vectors. F and $F^T$ are multiplied to obtain a matrix of 512 rows and 512 columns, and the matrix is the cosine similarity matrix CS of F. Each element CS[i][j] of the cosine similarity matrix CS represents the cosine similarity between the $i^{th}$ vector and the $j^{th}$ vector in the feature vector $F \in R^{1 \times 512}$, that is, the cosine similarity between the $i^{th}$ text descriptor and the $j^{th}$ text descriptor in the 512 text descriptors.

Then, as shown in FIG. 5A, at a block 502, the cosine similarity matrix is converted into a Laplacian graph L=D+ A, wherein L is the graph, and D and A are a degree matrix and an adjacency matrix, respectively. As shown in FIG. 5B, the Laplacian graph is obtained from conversion of the cosine similarity matrix as illustrated at 520. D and A are obtained by comparing cosine scores with a predefined threshold τ, that is, the cosine similarity matrix is converted into the Laplacian graph according to the predefined threshold τ. The threshold τ here is a predefined value that may be used for controlling connection relationships of nodes in the Laplacian graph. A small threshold can increase the quantity of connections between the nodes, while a large threshold can reduce the quantity of connections between the nodes. The specific threshold selection needs to be judged and adjusted based on an actual application scenario.

In order to convert this matrix into a Laplacian graph, a graph is initially constructed where nodes represent the original data (that is, vectors or text descriptors of the input data), and edges represent the similarities between nodes. During the process of constructing the graph, two key matrices need to be determined: a degree matrix D and an adjacency matrix A. Degree matrix D is a diagonal matrix, where each diagonal element represents the degree of a corresponding node, which is the quantity of edges directly connected to the node. Adjacency matrix A represents the connection relationships between nodes in the graph.

In the degree matrix D, each row or each column represents a node, and the diagonal element D[i][i] represents the degree of a node i (or the weight of the node i and its own edges). The non-diagonal element D[i][j] represents the weight of an edge between the node i and a node j. This degree matrix D may be calculated in the following manner: If the $i^{th}$ vector and the $j^{th}$ vector in the vectors $F \in R^{1 \times 512}$ of the input data are not exactly the same (that is, the $i^{th}$ text descriptor and the $j^{th}$ text descriptor in the 512 text descriptors are not exactly the same, and the cosine similarity between them is not equal to 1), D[i][j] is equal to a result of dividing an inner product of the $i^{th}$ vector and the $j^{th}$ vector of F by a product of the moduli of the two vectors (that is, D[i][j]=F[i]·F[j]/(‖F[i]‖ ‖F[j]‖)). If the $i^{th}$ vector and the $j^{th}$ vector in F are identical (that is, the $i^{th}$ text descriptor and the $j^{th}$ text descriptor in the 512 text descriptors are identical, and their cosine similarity is equal to 1), D[i][j] is equal to 1 (because the inner product between two identical vectors is 1).

The adjacency matrix A is calculated, where each element A[i][j] of the adjacency matrix A represents whether there is an edge connected between the node i and the node j. If there is an edge connected, A[i][j]=1; otherwise, A[i][j]=0. The adjacency matrix A may be calculated in the following manner: If the $i^{th}$ vector and the $j^{th}$ vector in the feature vectors $F \in R^{1 \times 512}$ of the input data are not exactly the same (that is, the $i^{th}$ text descriptor and the $j^{th}$ text descriptor in the 512 text descriptors are not exactly the same, and the cosine similarity between them is not equal to 1), A[i][j] is equal to 1 (because there is an edge between two nodes that are not exactly the same). If the $i^{th}$ vector and the $j^{th}$ vector in F are exactly the same (that is, the $i^{th}$ text descriptor and the $j^{th}$ text descriptor in the 512 text descriptors are exactly the same, and their cosine similarity is equal to 1), A[i][j] is equal to 0 (because there is no edge connected between identical nodes). The degree matrix D and the adjacency matrix A are added to obtain the Laplacian graph L=D+A. In general, by converting the cosine similarity matrix into the Laplacian graph, graph neural networks (GNNs) may be better utilized to process and analyze data, for mining complex relationships between data.

Then, as shown in FIG. 5A, at a block 503, a GNN is used to process the Laplacian graph to obtain a compressed Laplacian graph. Specifically, the Laplacian graph is sent to a GNN 530 for learning, so as to learn automatic data compression through a specific bit rate to obtain a compressed Laplacian graph 540. The GNN 530 is a specialized neural network for processing graph structured data, which can perform complex feature learning on nodes and edges in a graph. In a process of deduplication, the GNN 530 can learn features of each node in the graph and aggregate similar nodes together. The GNN 530 learns how to encode similar nodes into similar outputs on its own, so as to achieve the deduplication processing.

A loss function for processing the Laplacian graph using the GNN 530 may be calculated by using the following Equation (2):

$$L = -\log 2q([f(x) \cdot \lambda] + \mu) + \beta \cdot d(x, g([f(x) \cdot \lambda]/\lambda)) \quad (2)$$

wherein x represents the input Laplacian graph, "·" is pointwise multiplication, and division "/" is also performed pointwise, λ is a proportional parameter that controls the number of bits used for compression, and f and g are encoder and decoder parameters of the GNN 530. The encoder f is responsible for converting the original data into a compressed representation, while the decoder g restores the compressed representation to the original data or approximate original data.

In this way, by processing the Laplacian graph through the GNN 530, the Laplacian graph may be compressed to reduce redundant data connections while preserving data information to the maximum extent. That is, a compressed Laplacian graph 540 may be obtained. Visually, as shown in FIG. 5B, the compressed Laplacian graph 540 contains all data in the main diagonal direction, and therefore, it is possible to compress the Laplacian graph while preserving the data in the main diagonal direction as much as possible. This process is user-controllable data deduplication, and the user may define a compression rate for deduplication.

As shown in FIG. 5A, at a block 504, duplicate text descriptors in a plurality of text descriptors are removed based on the compressed Laplacian graph, for removing duplicate data. As can be seen from FIG. 5B, by taking the 1st to 7th text descriptors 510 in the lookup table as inputs and through deduplication processing, it may be found that the 4th text descriptor and the 1st text descriptor are duplicated, and the 3rd text descriptor and the 6th text descriptor are duplicated. Therefore, the 4th and 6th text descriptors may be removed. Therefore, duplicate text descriptors in the query table may be removed based on the compressed or dimensionally reduced Laplacian graph to obtain a deduplicated query table 550, thereby removing the data corresponding to the text descriptors.

Referring back to FIG. 2, at a block 204, a query table for query is generated based on the text descriptors. As shown in FIG. 3, each entry in the query table 305 corresponds to a compressed feature, a text descriptor, or an identifier of one piece of input data. After the deduplication processing in the block 203, a deduplicated query table 305 may be generated. Each entry is obtained by processing the input data through one or a plurality of most suitable trained models. A plurality of entries may be obtained from the same trained model.

The data management method according to the present disclosure may further include a process of querying data. Schematic diagrams of operations performed during data query will be illustrated below with reference to FIG. 2 and FIG. 6.

At a block 205, based on comparison between a query request label of a user and the text descriptors of the query table, at least one candidate text descriptor corresponding to at least one text descriptor in the query table is determined. If the text descriptors in the query table are classified into different storage areas according to different data categories, and if the user wants to query photos such as traveling in Japan, he/she may compare the query request with the text descriptors corresponding to the pictures, rather than comparing the query request with the text descriptors used for videos or audio. In one example, in order to achieve the objective, a cosine similarity between the query and a dictionary is calculated, where the query is an input label of the user, and the dictionary is the entire dataset of the query table (that is, all text descriptors of the query table for a certain type of data).

Figure 6:
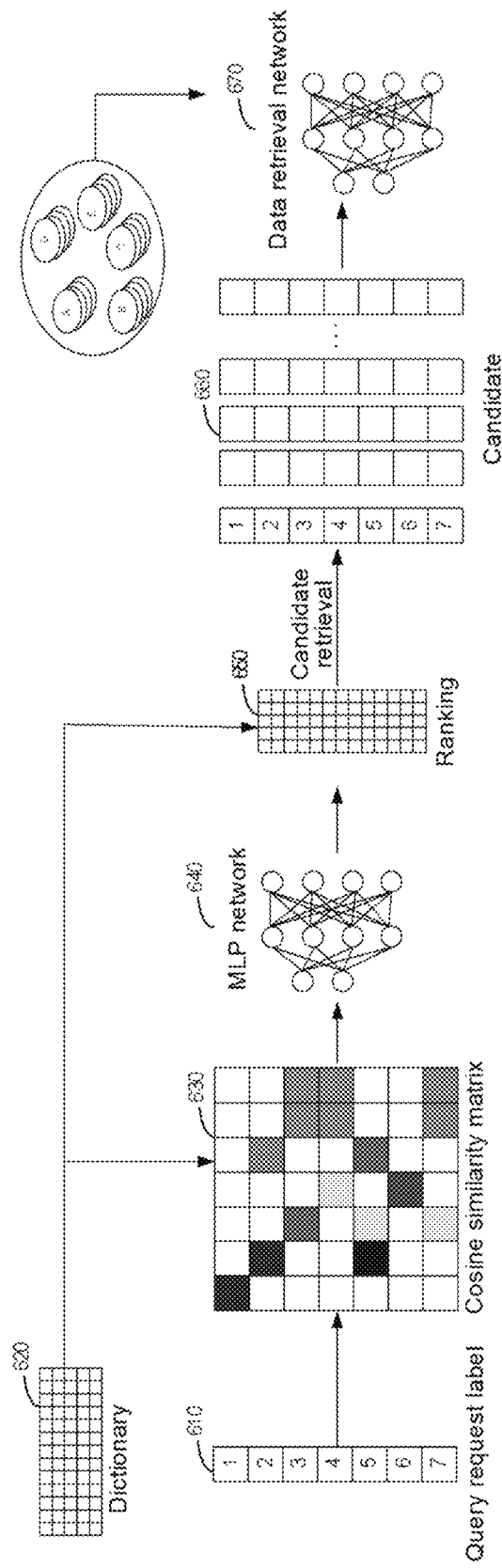
FIG. 6 shows a schematic diagram of a process for data query according to some embodiments of the present disclosure.

As shown in FIG. 6, a query request 610 may be converted into a query request label. A dictionary 620 includes the entire dataset of the query table. Then, a cosine similarity matrix 630 between the query request label and the dictionary is calculated. Then, the calculated cosine similarity matrix 630 is input into a multi-layer perceptron (MLP) network 640 to rank cosine scores. The first K cosine scores 650 ranking at the top may be used for retrieving K data candidates 660. Correspondingly, as shown in FIG. 3, the computing device 102 further includes a candidate selection module 306 that selects at least one candidate text descriptor 307 corresponding to the query request from a plurality of text descriptors. The candidate selection module 306 may perform the steps described at the block 205.

As shown in FIG. 2, at a block 206, a pre-trained data recovery module corresponding to the at least one candidate text descriptor is used to recover original data corresponding to the at least one candidate text descriptor. As shown in FIG. 6, for the K data candidates 660, a pre-trained model in a data retrieval network 670 is used to recover the original data according to feature vectors. Note that the data retrieval network 670 is paired one-on-one with an appropriate model selected from the deep network pool 301 shown in FIG. 3 to ensure the maximum information gain. That is, data compression and data recovery operations are a pair of inverse operations that can be implemented by using the same pre-trained model in the model pool.

In the data management method according to the present disclosure, a deep network pool is used for content lossless data storage. Specifically, a multi-modal neural network pool is provided, which can be used for storing and managing text, audio, images/videos, and 3D data. The method according to the present disclosure assembles a plurality of deep networks into a pool, which can automatically process data to obtain text descriptors or IDs for data retrieval. The overall memory cost of the deep network pool and the small overhead of the text descriptors are significantly lower than original data. It can also achieve efficient data compression and data retrieval. In addition, the method according to the present disclosure further provides a data purification scheme embedded in a deep network pool, for deduplicating customer data and achieving efficient data management. It detects and removes data with duplicate content to preserve information as much as possible.

Therefore, the entire data access and management may be provided to a user as a cloud service. Many related applications may be added as new functions. In short, main contributions of the data management method disclosed according to the present disclosure include: providing a complete deep learning-based framework that can automatically process all data types used for data management, especially efficient data storage and retrieval. Then, a deduplicator that can process data features (e.g., text descriptors) is further provided, which can remove redundant data for information abstraction. Finally, based on a feature ranking scheme, a novel data retrieval method is provided, which can generate a plurality of candidates that match the text descriptors of actual applications.

Figure 7A:
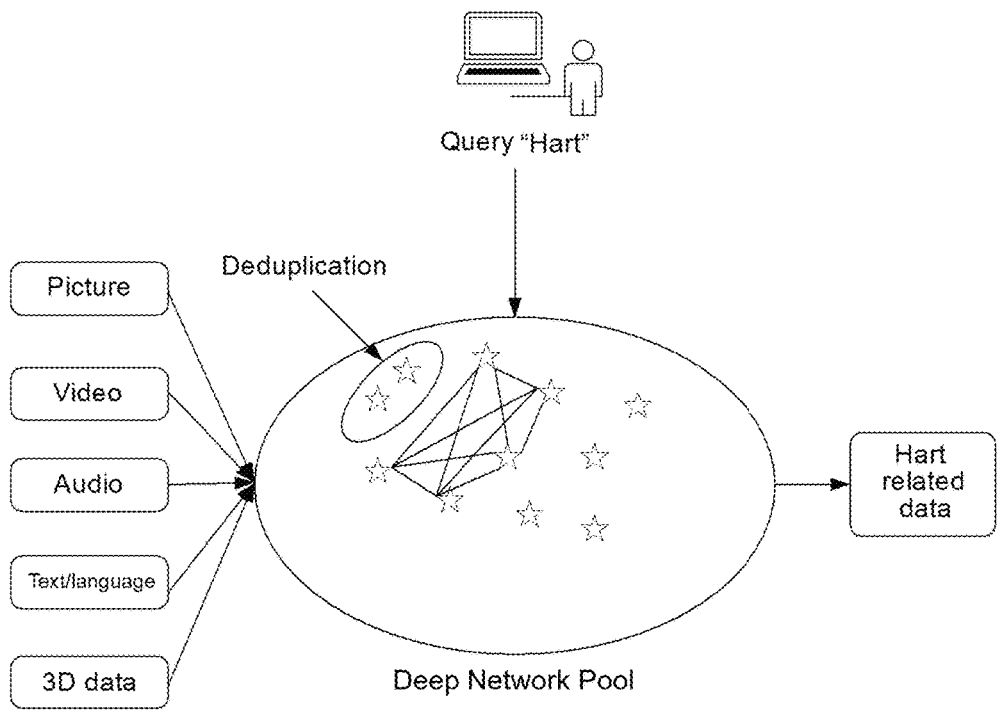
FIG. 7A and FIG. 7B show schematic diagrams of examples for data compression and retrieval according to some embodiments of the present disclosure.
Figure 7B:
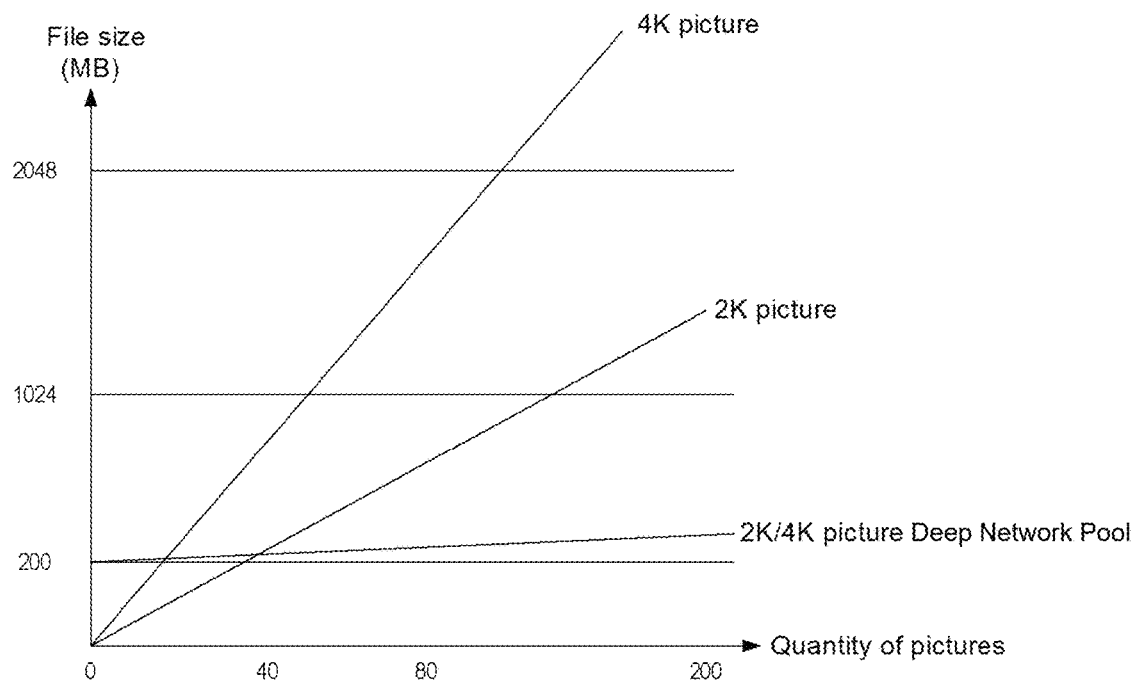

Examples of actual usage scenarios of the data management method according to the present disclosure will be described below with reference to FIG. 7A and FIG. 7B.

In the present disclosure, a novel framework for data compression through a deep network pool is provided, which may be used for data management and retrieval, and can effectively remove redundant data and achieve a high compression rate. Given different types of data, including text, images, audio, and videos, input data is projected onto a potential space learned by a deep network pool, for performing data compression. The deep network pool May 1) delete redundant data according to a feature similarity (e.g., redundant images), and 2) retrieve relevant data according to a user query. For example, a user may query "Hart." Then, through processing of the deep network pool, Hart related videos, audio, and images may be output.

To illustrate the data compression rate using the deep network pool compared with other compression techniques, image compression is taken as an example. As can be seen from FIG. 7B, using the deep network pool for data compression is particularly beneficial when using more high-resolution images. In a conventional method, the memory of 2K or 4K images is linearly related to the quantity of images. However, when the deep network pool is used for image compression, the slope of the straight line is very small because the main data storage is a deep network pool model file (e.g., about 200 MB), and the remaining data storage is a feature vector of each piece of input data (e.g., about 2 KB per data sample).

The data management method according to the present disclosure is a simple and efficient data management technique. It can provide significant advantages for artificial intelligence synthetic data processing. All synthetic data generated by artificial intelligence models can alternatively be stored as a model itself, without storing the original synthetic data. It can significantly reduce data storage and effectively retrieve query data with relatively small computational overhead. In the long run, the disclosed deep network pool may be deployed at a cloud, and therefore, cloud data storage services and edge hardware deployment may be provided. It uses the GNN for data deduplication and uses an MLP network for data candidate recommendation. The method and architecture according to the present disclosure may be used in data management related applications.

Example Device

Figure 8:
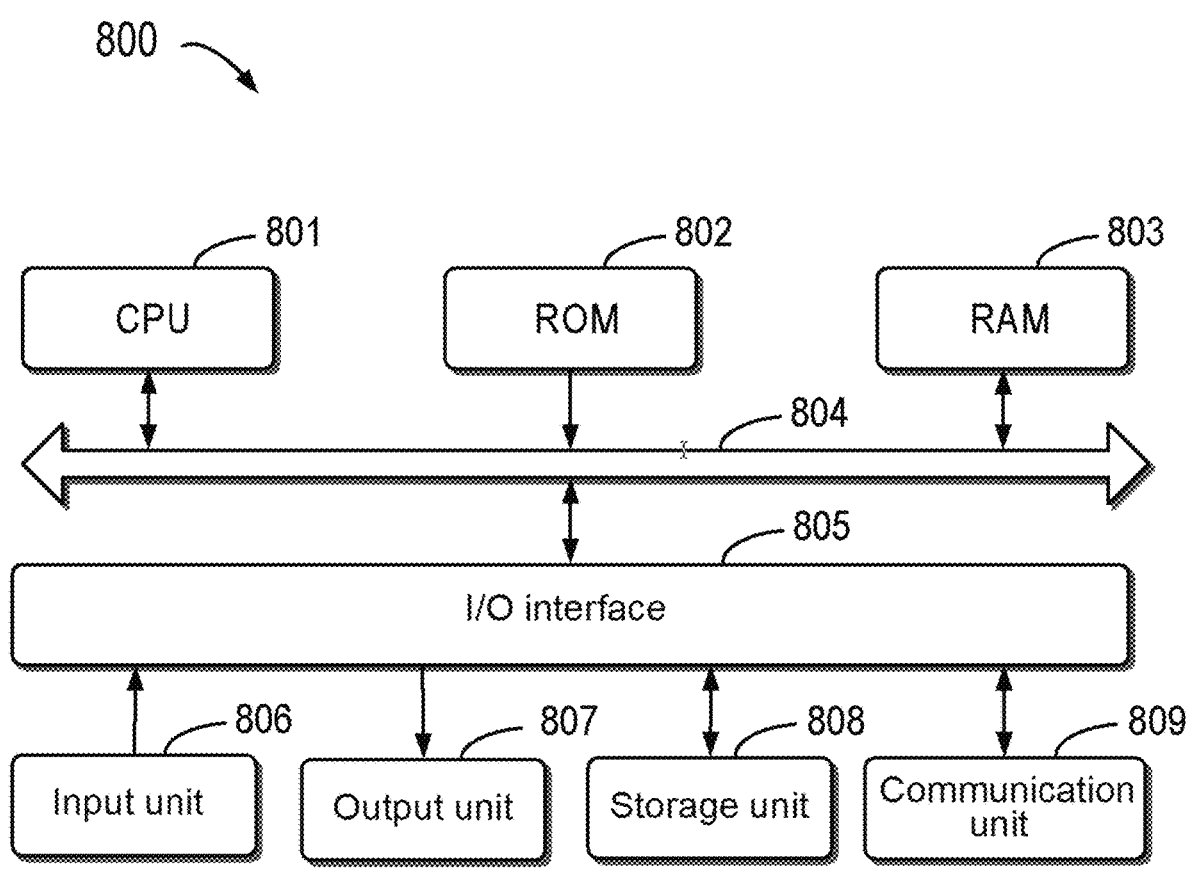
FIG. 8 shows a block diagram of a computing device that can implement a plurality of embodiments of the present disclosure.

FIG. 8 shows a schematic block diagram of an example device 800 that can be used to implement embodiments of the present disclosure. The device 800 may be configured to implement the computing device 102 as shown in FIG. 1. As shown in the figure, the device 800 includes a central processing unit (CPU) 801 that may execute various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The CPU 801 performs the various methods and processes described above, such as methods and/or processes 200, 400 and 500. For example, in some embodiments, any one of the methods and/or processes 200, 400 and 500 may be implemented as a computer software program that is tangibly included in a machine-readable medium, for example, the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more steps of any one of the methods and/or processes 200, 400 and 500 described above can be performed. Alternatively, in other embodiments, the CPU 801 may be configured in any other suitable manner (e.g., by means of firmware) to perform any one of the methods and/or processes 200, 400 and 500.

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for data query, comprising:
   selecting, according to a type of input data, a target pre-trained model from a deep network pool comprising a plurality of pre-trained models;
   performing, by using the selected target pre-trained model, feature extraction on the input data to determine text descriptors for the input data; and
   generating, based on the text descriptors, a query table for query.

2. The method for data query according to claim 1, further comprising:
   removing, based on a plurality of text descriptors for a plurality of pieces of input data, duplicate data from the plurality of pieces of input data to obtain a deduplicated query table.

3. The method for data query according to claim 1, further comprising:
   determining, based on comparison between a query request label of a user and the text descriptors of the query table, at least one candidate text descriptor corresponding to at least one text descriptor in the query table; and
   recovering, by using a pre-trained data recovery module corresponding to the at least one candidate text descriptor, original data corresponding to the at least one candidate text descriptor,
   wherein the pre-trained data recovery module corresponds to the target pre-trained model used for feature extraction for the at least one candidate text descriptor.

4. The method for data query according to claim 1, wherein the input data comprises at least one category of the following categories: image data, video data, voice data, natural language text, and three-dimensional image data.

5. The method for data query according to claim 1, wherein selecting, according to the type of the input data, a target trained model from the deep network pool comprising the plurality of pre-trained models comprises:
   randomly sampling the input data to obtain a subset of the input data;
   determining, based on the subset, an evaluation score of each model in the plurality of pre-trained models; and selecting, based on the evaluation scores, the target pre-trained model from the plurality of pre-trained models.

6. The method for data query according to claim 5, wherein determining, based on the subset, the evaluation score of each model in the plurality of pre-trained models comprises:
- determining a data fidelity of the subset;
- determining, based on the data fidelity, a data compression rate and computational complexity for each model in the plurality of pre-trained models; and
- determining the evaluation score for each model based on at least one of the determined data compression rate and computational complexity,
- wherein the evaluation score determined for the same pre-trained model varies with the data fidelity.

7. The method for data query according to claim 2, wherein removing, based on the plurality of text descriptors for the plurality of pieces of input data, duplicate data from the plurality of pieces of input data to obtain the deduplicated query table comprises:
- determining a cosine similarity matrix of the plurality of text descriptors;
- converting the cosine similarity matrix into a Laplacian graph;
- processing the Laplacian graph by using a graph neural network to obtain a compressed Laplacian graph; and
- removing, based on the compressed Laplacian graph, duplicate text descriptors from the plurality of text descriptors to remove the duplicate data.

8. The method for data query according to claim 3, wherein determining, based on the comparison between a query request label of a user and the text descriptors of the query table, the at least one candidate text descriptor corresponding to the at least one text descriptor in the query table comprises:
- determining a plurality of similarities between the query request label and the text descriptors in the query table; and
- ranking the plurality of similarities to determine at least one corresponding text descriptor at the top of the ranking as the at least one candidate text descriptor.

9. The method for data query according to claim 8, wherein ranking the plurality of similarities to determine the at least one corresponding text descriptor at the top of the ranking as the at least one candidate text descriptor comprises:
- inputting a pre-similarity matrix composed of the plurality of similarities into a multi-layer perceptron network to rank the plurality of similarities.

10. An electronic device, comprising:
- at least one processor; and
- a memory coupled to the at least one processor, wherein the memory has instructions stored therein, and the instructions, when executed by the at least one processor, cause the electronic device to perform actions comprising:
- selecting, according to a type of input data, a target pre-trained model from a deep network pool comprising a plurality of pre-trained models;
- performing, by using the selected target pre-trained model, feature extraction on the input data to determine text descriptors for the input data; and
- generating, based on the text descriptors, a query table for query.

11. The electronic device according to claim 10, wherein the actions further comprise: removing, based on a plurality of text descriptors for a plurality of pieces of input data, duplicate data from the plurality of pieces of input data to obtain a deduplicated query table.

12. The electronic device according to claim 10, wherein the actions further comprise:
- determining, based on comparison between a query request label of a user and the text descriptors of the query table, at least one candidate text descriptor corresponding to at least one text descriptor in the query table; and
- recovering, by using a pre-trained data recovery module corresponding to the at least one candidate text descriptor, original data corresponding to the at least one candidate text descriptor,
- wherein the pre-trained data recovery module corresponds to the target pre-trained model used for feature extraction for the at least one candidate text descriptor.

13. The electronic device according to claim 10, wherein the input data comprises at least one category of the following categories: image data, video data, voice data, natural language text, and three-dimensional image data.

14. The electronic device according to claim 10, wherein selecting, according to the type of the input data, a target trained model from the deep network pool comprising the plurality of pre-trained models comprises:
- randomly sampling the input data to obtain a subset of the input data;
- determining, based on the subset, an evaluation score of each model in the plurality of pre-trained models; and
- selecting, based on the evaluation scores, the target pre-trained model from the plurality of pre-trained models.

15. The electronic device according to claim 14, wherein determining, based on the subset, the evaluation score of each model in the plurality of pre-trained models comprises:
- determining a data fidelity of the subset;
- determining, based on the data fidelity, a data compression rate and computational complexity for each model in the plurality of pre-trained models; and
- determining the evaluation score for each model based on at least one of the determined data compression rate and computational complexity,
- wherein the evaluation score determined for the same pre-trained model varies with the data fidelity.

16. The electronic device according to claim 11, wherein removing, based on the plurality of text descriptors for the plurality of pieces of input data, duplicate data from the plurality of pieces of input data to obtain the deduplicated query table comprises:
- determining a cosine similarity matrix of the plurality of text descriptors;
- converting the cosine similarity matrix into a Laplacian graph;
- processing the Laplacian graph by using a graph neural network to obtain a compressed Laplacian graph; and
- removing, based on the compressed Laplacian graph, duplicate text descriptors from the plurality of text descriptors to remove the duplicate data.

17. The electronic device according to claim 12, wherein determining, based on the comparison between a query request label of a user and the text descriptors of the query table, the at least one candidate text descriptor corresponding to the at least one text descriptor in the query table comprises:
- determining a plurality of similarities between the query request label and the text descriptors in the query table; and ranking the plurality of similarities to determine at least one corresponding text descriptor at the top of the ranking as the at least one candidate text descriptor.

18. The electronic device according to claim 17, wherein ranking the plurality of similarities to determine the at least one corresponding text descriptor at the top of the ranking as the at least one candidate text descriptor comprises:
   inputting a pre-similarity matrix composed of the plurality of similarities into a multi-layer perceptron network to rank the plurality of similarities.

19. A computer program product, wherein the computer program product is tangibly stored on a non-transitory computer-readable medium and comprises machine-executable instructions, and the machine-executable instructions, when executed by a machine, cause the machine to perform actions comprising:
   selecting, according to a type of input data, a target pre-trained model from a deep network pool comprising a plurality of pre-trained models;
   performing, by using the selected target pre-trained model, feature extraction on the input data to determine text descriptors for the input data; and
   generating, based on the text descriptors, a query table for query.

20. The computer program product according to claim 19, wherein the actions further comprise: removing, based on a plurality of text descriptors for a plurality of pieces of input data, duplicate data from the plurality of pieces of input data to obtain a deduplicated query table.

* * * * *